United States Patent
Hamamura

(10) Patent No.: US 10,156,584 B2
(45) Date of Patent: Dec. 18, 2018

(54) MEMS PIEZORESISTIVE ACCELERATION SENSOR

(71) Applicant: Murata Manufacturing Co., Ltd., Nagaokakyo-shi, Kyoto-fu (JP)

(72) Inventor: Hiroshi Hamamura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 388 days.

(21) Appl. No.: 14/944,454

(22) Filed: Nov. 18, 2015

(65) Prior Publication Data

US 2016/0069927 A1 Mar. 10, 2016

Related U.S. Application Data

(63) Continuation of application No. PCT/JP2014/062768, filed on May 14, 2014.

(30) Foreign Application Priority Data

Jun. 4, 2013 (JP) ................................. 2013-117956

(51) Int. Cl.
*G01P 15/12* (2006.01)
*G01P 21/00* (2006.01)

(52) U.S. Cl.
CPC ............ *G01P 15/123* (2013.01); *G01P 21/00* (2013.01)

(58) Field of Classification Search
CPC ......... G01P 21/00; G01P 15/123; G01P 15/12
USPC ...................................................... 73/514.33
See application file for complete search history.

(56) References Cited

U.S. PATENT DOCUMENTS

| | | | | |
|---|---|---|---|---|
| 4,848,157 A | * | 7/1989 | Kobayashi | ........... G01P 15/0802 338/5 |
| 5,251,485 A | | 10/1993 | Kondo | |
| 5,343,731 A | | 9/1994 | Miyano | |
| 6,448,624 B1 | | 9/2002 | Ishio et al. | |
| 7,069,789 B2 | * | 7/2006 | Tokunaga | ............... G01C 19/56 73/777 |
| 7,574,914 B2 | * | 8/2009 | Mochida | ............... G01P 15/123 73/509 |

(Continued)

FOREIGN PATENT DOCUMENTS

| | | |
|---|---|---|
| JP | 01-163673 A | 6/1989 |
| JP | 04-13975 A | 1/1992 |

(Continued)

OTHER PUBLICATIONS

Official Communication issued in International Patent Application No. PCT/JP2014/062768, dated Jul. 8, 2014.

*Primary Examiner* — Jonathan Dunlap
*Assistant Examiner* — Octavia Hollington
(74) *Attorney, Agent, or Firm* — Keating & Bennett, LLP

(57) ABSTRACT

An acceleration sensor includes a fixing portion, a weight portion, a detection beam, support beams, and a metal wiring. The weight portion is supported on the fixing portion so as to be freely displaced. The detection beam is connected to the fixing portion and the weight portion and piezoresistive elements are provided on the detection beam. The support beams are provided separately from the detection beam and are connected to the fixing portion and the weight portion. Both ends of the metal wiring are extended to the fixing portion and the metal wiring is wired so as to pass through the support beams.

19 Claims, 7 Drawing Sheets

(56) References Cited

U.S. PATENT DOCUMENTS

| | | | | |
|---|---|---|---|---|
| 7,631,559 | B2* | 12/2009 | Mochida | G01P 15/0802 |
| | | | | 73/509 |
| 8,522,613 | B2* | 9/2013 | Suzuki | G01P 15/0802 |
| | | | | 73/514.33 |
| 9,146,254 | B2* | 9/2015 | Yoshida | B81B 3/0021 |
| 2003/0229981 | A1* | 12/2003 | Mahon | G01P 15/0802 |
| | | | | 29/594 |

FOREIGN PATENT DOCUMENTS

| | | |
|---|---|---|
| JP | 05-93738 A | 4/1993 |
| JP | 07-43381 A | 2/1995 |
| JP | 07-325105 A | 12/1995 |
| JP | 09-304426 A | 11/1997 |
| JP | 10-123167 A | 5/1998 |

\* cited by examiner

MEMS PIEZORESISTIVE ACCELERATION SENSOR

BACKGROUND OF THE INVENTION

1. Field of the Invention

The present invention relates to an acceleration sensor including a piezoresistive element.

2. Description of the Related Art

An acceleration sensor employs a configuration including a detection beam on which a piezoresistive element is provided, a fixing portion supporting the detection beam, and a weight portion that is supported by the detection beam in some cases. The acceleration sensor having such a configuration has a risk that the detection beam is broken during manufacturing. In order to detect failure of the detection beam, a resistance wiring for failure detection is provided so as to extend around the periphery of the piezoresistive element in some cases (for example, see Japanese Unexamined Patent Application Publication No. 7-43381 and Japanese Unexamined Patent Application Publication No. 7-325105).

In the acceleration sensor, in order to adjust vibration characteristics and the like, a support beam supporting a weight portion is provided in addition to a detection beam in some cases. In this case, generation of breakage on the support beam during manufacturing of the acceleration sensor causes variation in characteristics of the acceleration sensor to occur. The variation in the characteristics due to the breakage of the beam can be detected based on variation in output from a piezoresistive element on the detection beam. However, a characteristic screening operation on the acceleration sensor based on the variation in the output from the piezoresistive element is troublesome and it is difficult to screen the acceleration sensor with characteristic failure reliably by the operation.

SUMMARY OF THE INVENTION

Preferred embodiments of the present invention provide an acceleration sensor capable of a characteristic screening operation to be performed easily and capable of screening the acceleration sensor reliably when characteristic failure occurs on the acceleration sensor.

An acceleration sensor according to an aspect of various preferred embodiments of the present invention includes a fixing portion, a weight portion, a detection beam, a support beam, and a wiring portion. The weight portion is supported on the fixing portion so as to be freely displaced. The detection beam is connected to the fixing portion and the weight portion and a piezoresistive element is provided on the detection beam. The support beam is provided separately from the detection beam and is connected to the fixing portion and the weight portion. Both ends of the wiring portion are extended to the fixing portion and the wiring portion is wired so as to pass through the support beam.

With this configuration, characteristics of the acceleration sensor are able to be screened using the wiring portion provided on the support beam. That is to say, the acceleration sensor on which variation in characteristics such as vibration characteristics occurs due to breakage of the support beam is able to be screened. Accordingly, a troublesome operation of screening the characteristics of the acceleration sensor based on variation in output from the piezoresistive element is not necessary and the acceleration sensor with characteristic failure due to the breakage of the support beam is screened more reliably.

In the above-mentioned acceleration sensor according to various preferred embodiments of the present invention, it is preferable that among the fixing portion, the weight portion, the detection beam, and the support beam, at least the supporting beam includes a silicon substrate and the wiring portion includes an injection wiring including impurities in the silicon substrate.

With this configuration, no unnecessary stress from the wiring portion acts on the support beam. If the wiring portion is configured by a metal wiring, film stress acts on the support beam and variation in the film stress occurs depending on temperature, which results in the variation in the characteristics of the acceleration sensor in some cases. However, when the wiring portion on the support beam is configured by the injection wiring, the variation in the characteristics of the acceleration sensor does not occur.

In the above-mentioned acceleration sensor according to various preferred embodiments of the present invention, it is preferable that the wiring portion include an enlarged wiring width portion on the support beam.

With this configuration, wiring resistance of the injection wiring is significantly reduced. Further, even when the width of the support beam is large, breakage is able to be detected on the overall region of the support beam in the width direction.

In the above-mentioned acceleration sensor according to various aspects of preferred embodiments of the present invention, it is preferable that the piezoresistive element be connected to the wiring portion.

With this configuration, variation in the characteristics due to breakage of the beam is able to be detected at the same time as measurement of output characteristics from the piezoresistive element, so that a manufacturing process is able to be simplified.

According to various preferred embodiments of the present invention, the characteristics of the acceleration sensor are able to be screened using the wiring portion provided on the support beam. This eliminates the necessity of a troublesome operation of screening the acceleration sensor on which variation in characteristics has occurred due to breakage of the support beam based on variation in output from the piezoresistive element. Further, the characteristic screening of the acceleration sensor using the wiring portion provided on the support beam enables the acceleration sensor with characteristic failure to be screened more reliably.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

An acceleration sensor according to a first preferred embodiment of the present invention will be described with reference to FIGS. 1 to 4D. In the individual drawings, a Z axis along a thickness direction of the acceleration sensor, a Y axis along a planar direction of the acceleration sensor and orthogonal to the Z axis, and an X axis orthogonal to the Z axis and the Y axis are noted.

Figure 1:
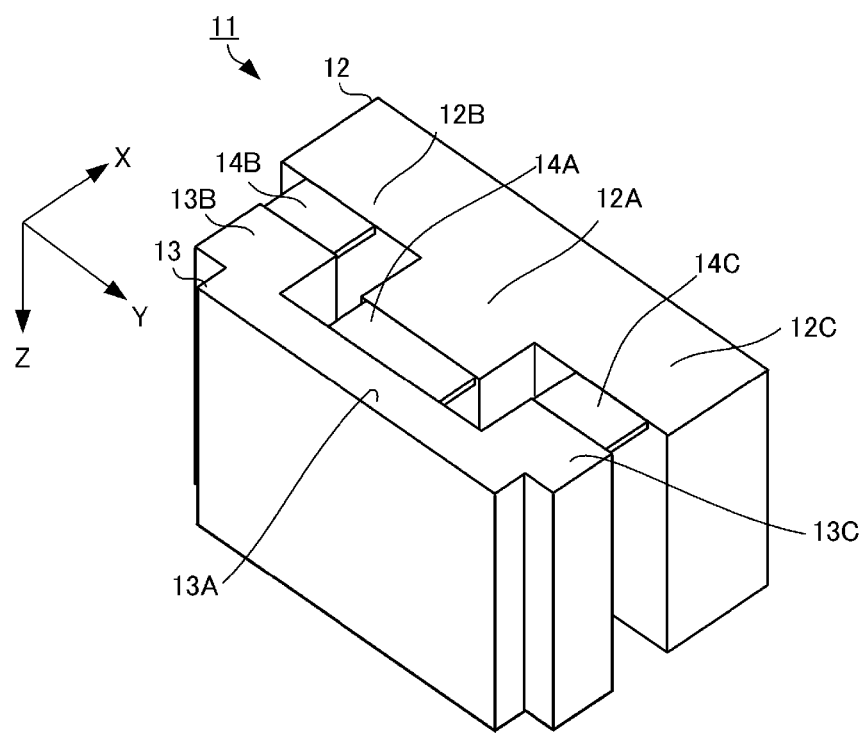
FIG. 1 is a perspective view illustrating an acceleration sensor according to a first preferred embodiment of the present invention.
Figure 2A:
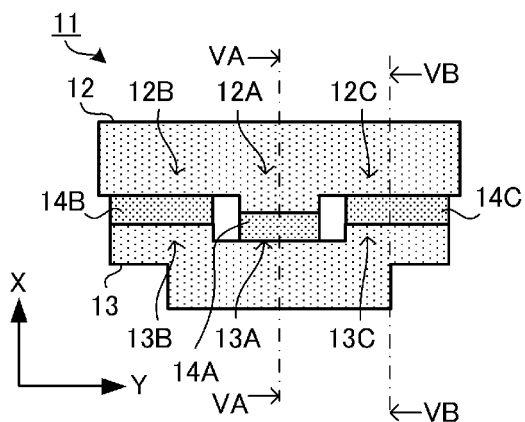
FIGS. 2A-2C include a plan view and cross-sectional views illustrating the acceleration sensor in the first preferred embodiment of the present invention.
Figure 2B:
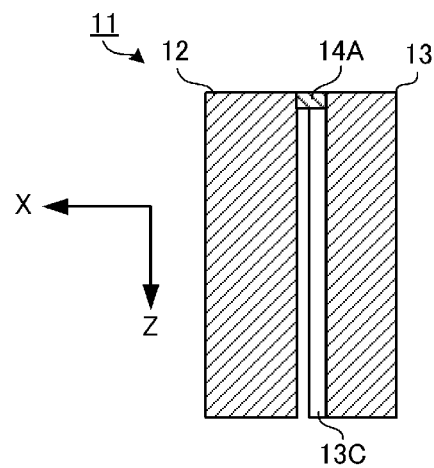
Figure 2C:
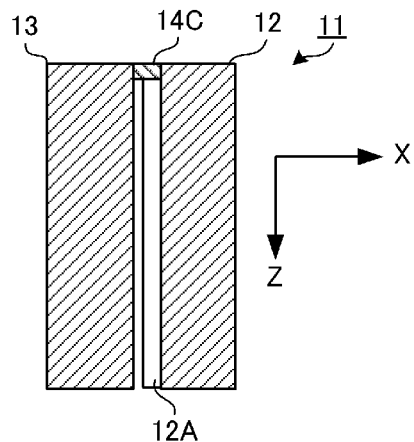

FIG. 1 is a perspective view illustrating an acceleration sensor 11 according to the first preferred embodiment of the present invention. FIG. 2A is a plan view along an X-Y plane of the acceleration sensor 11 when seen from the above. FIG. 2B is a cross-sectional view along an X-Z plane of the acceleration sensor 11 cut along a line VA-VA in FIG. 2A. FIG. 2C is a cross-sectional view along the X-Z plane of the acceleration sensor 11 cut along a line VB-VB in FIG. 2A.

The acceleration sensor 11 is a micro-electro-mechanical systems (MEMS) piezoresistive acceleration sensor preferably formed by performing microfabrication process, which will be described later, such as etching processing on a silicon on insulator (SOI) substrate.

The acceleration sensor 11 has a plane-symmetric shape with respect to the X-Z plane. The acceleration sensor 11 includes a fixing portion 12, a weight portion 13, a detection beam 14A, support beams 14B and 14C, and an acceleration detection circuit (not illustrated). As will be described in detail later, a Wheatstone bridge defined by a piezoresistive element is provided on the detection beam 14A. As will be described in detail later, wiring portions for characteristic screening are provided on the support beams 14B and 14C.

The fixing portion 12 is arranged at the positive side in the X-axis direction when seen along the X-Y plane as illustrated in FIG. 2A. The surface of the fixing portion 12 at the negative side in the X-axis direction, which opposes the weight portion 13, has a projecting shape such that the center thereof projects to the weight portion 13 side (negative side in the X-axis direction). In other words, the fixing portion 12 includes a projecting portion 12A as a region with a portion projecting to the weight portion 13 side, a recess portion 12B as a region at the negative side in the Y-axis direction relative to the projecting portion 12A, and a recess portion 12C as a region at the positive side in the Y-axis direction relative to the projecting portion 12A.

The weight portion 13 is arranged at the negative side in the X-axis direction when seen along the X-Y plane as illustrated in FIG. 2A. The surface of the weight portion 13 at the positive side in the X-axis direction, which opposes the fixing portion 12, has a recess shape such that the center thereof is recessed to the side opposite to the fixing portion 12 side (negative side in the X-axis direction). In other words, the weight portion 13 includes a recess portion 13A as a region with a portion recessed to the side opposite to the fixing portion 12 side, a projecting portion 13B as a region at the negative side in the Y-axis direction relative to the recess portion 13A, and a projecting portion 13C as a region at the positive side in the Y-axis direction relative to the recess portion 13A. The surface of the weight portion 13 at the negative side in the X-axis direction may have an arbitrary shape and, in this example, has a projecting shape such that the center thereof projects.

The weight portion 13 and the fixing portion 12 are provided such that the irregular configurations thereof do not come into each other when seen along the X-Y plane as illustrated in FIG. 2A. That is to say, the leading ends of the projecting portions 13B and 13C of the weight portion 13 at the positive side in the X-axis direction are located at the negative side in the X-axis direction, that is, the weight portion 13 side relative to the leading end of the projecting portion 12A of the fixing portion 12 at the negative side in the X-axis direction. Further, the leading end of the projecting portion 12A of the fixing portion 12 at the negative side in the X-axis direction is located at the positive side in the X-axis direction, that is, the fixing portion 12 side relative to the leading ends of the projecting portions 13B and 13C of the weight portion 13 at the positive side in the X-axis direction. The fixing portion 12 and the weight portion 13 may be configured such that the irregular configurations thereof come into each other instead of the configuration in which the irregular configurations thereof do not come into each other. In addition, the widths and the positions of the respective projecting portions and the respective recess portions in the Y-axis direction may be arbitrary unless the projecting portions and the recess portions of the irregular configurations interfere with opposing or adjacent recess portions or projecting portions.

The detection beam 14A and the support beams 14B and 14C are provided between the weight portion 13 and the fixing portion 12 on the X axis when seen along the X-Y plane as illustrated in FIG. 2A and are connected to the weight portion 13 and the fixing portion 12. To be more specific, the detection beam 14A is arranged between the support beam 14B and the support beam 14C on the Y axis and is connected to the projecting portion 12A of the fixing portion 12 and the recess portion 13A of the weight portion 13. The support beam 14B is arranged at the negative side in the Y-axis direction relative to the detection beam 14A, and is connected to the recess portion 12B of the fixing portion 12 and the projecting portion 13B of the weight portion 13. The support beam 14C is arranged at the positive side in the Y-axis direction relative to the detection beam 14A, and is connected to the recess portion 12C of the fixing portion 12 and the projecting portion 13C of the weight portion 13.

The weight portion 13 and the fixing portion 12 have a rectangular or substantially rectangular shape having short sides parallel with the X axis and long sides parallel with the Z axis when seen along the X-Z plane as illustrated in FIG. 2B and FIG. 2C. Each of the detection beam 14A and the support beams 14B and 14C has a flat plate-shaped configuration and the thickness direction thereof corresponds to the Z-axis direction. Further, each of the detection beam 14A and the support beams 14B and 14C has flexibility in the Z-axis direction and is connected to end portions of the weight portion 13 and the fixing portion 12 at the negative side in the Z-axis direction.

Next, the arrangement structure of the piezoresistive element and the wiring structure in the acceleration sensor 11 will be described.

Figure 3:
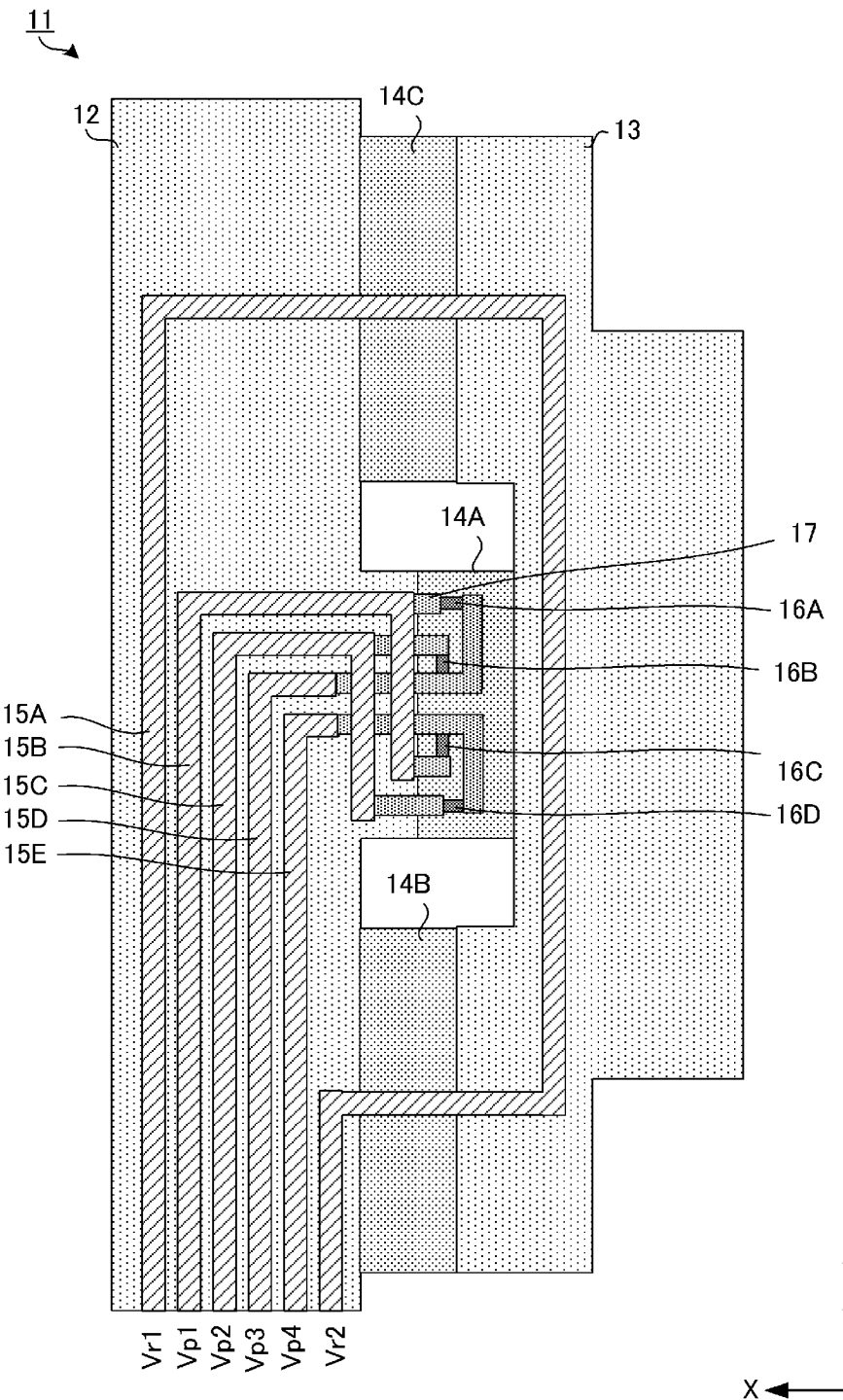
FIG. 3 is a plan view for explaining a wiring structure of the acceleration sensor in the first preferred embodiment of the present invention.

FIG. 3 is a plan view of the acceleration sensor 11 along the X-Y plane when seen from the above, which illustrates the arrangement structure and the wiring structure of the piezoresistive element.

The acceleration sensor 11 includes metal wirings 15A, 15B, 15C, 15D, and 15E, piezoresistive elements 16A, 16B, 16C, and 16D, and injection wirings 17.

The piezoresistive elements 16A, 16B, 16C, and 16D define the Wheatstone bridge and are arranged on a region of the detection beam 14A where maximum stress acts thereon. The piezoresistive elements 16A and 16D are arranged such that the directions thereof along the X axis correspond to the lengthwise directions thereof. The piezoresistive elements 16B and 16C are arranged such that the directions thereof along the Y axis correspond to the lengthwise directions thereof. When stress with deflection of the detection beam 14A acts on the piezoresistive element 16A, 16B, 16C, and 16D, the piezoresistive element 16A, 16B, 16C, and 16D extend or contract in the lengthwise direction and resistance values vary.

The injection wirings 17 are electrically connected to both ends of each of the piezoresistive elements 16A, 16B, 16C, and 16D in the lengthwise direction. The piezoresistive element 16A is electrically connected to between the metal wiring 15B and the metal wiring 15D through the injection wirings 17. The piezoresistive element 16B is electrically connected to between the metal wiring 15C and the metal wiring 15D through the injection wirings 17. The piezoresistive element 16C is electrically connected to between the metal wiring 15B and the metal wiring 15E through the injection wirings 17. The piezoresistive element 16D is electrically connected to between the metal wiring 15C and the metal wiring 15E through the injection wirings 17. The metal wirings 15B, 15C, 15D, and 15E are connected to terminals Vp1, Vp2, Vp3, and Vp4 of the acceleration detection circuit, respectively.

The metal wiring 15A is wired so as to start from the fixing portion 12, pass through the support beam 14C, the weight portion 13, and the support beam 14B in this order, and return to the fixing portion 12, again. Both ends of the metal wiring 15A are connected to the circuit terminals Vr1 and Vr2 for characteristic screening, respectively. The metal wiring 15A is provided as a wiring portion for characteristic screening. Broken states of the support beams 14B and 14C through which the metal wiring 15A pass are grasped by detecting the wiring resistance of the metal wiring 15A.

Next, a non-limiting example of a method for manufacturing the acceleration sensor 11 according to the first preferred embodiment of the present invention will be described. FIGS. 4A-4D are cross-sectional views cut along a Y-Z plane for explaining the method for manufacturing the acceleration sensor 11. With the manufacturing method as illustrated in FIGS. 4A-4D, an apparatus including the acceleration sensor 11 is manufactured. The cross-sectional view cut along the Y-Z plane as illustrated in FIGS. 4A-4D corresponds to the cross-sectional view cut along the X-Z plane as illustrated in FIG. 2B. It should be noted that hereinafter, description is made while the piezoresistive elements 16A to 16D are referred to as a piezoresistive element 16 as a representative. Further, the metal wirings 15A to 15E are referred to as a metal wiring 15 as a representative.

Figure 4A:
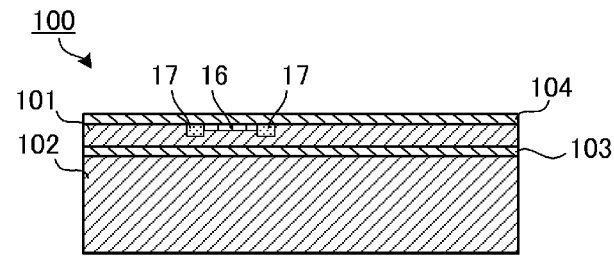
FIGS. 4A-4D include cross-sectional views for explaining a method for manufacturing the acceleration sensor in the first preferred embodiment of the present invention.

First, as illustrated in FIG. 4A, an SOI substrate 100 is prepared. The SOI substrate 100 includes a silicon substrate 101, a silicon substrate 102, and an insulating layer 103 made of $SiO_2$ or SiN, for example. The insulating layer 103 is interposed between the silicon substrate 101 and the silicon substrate 102. The silicon substrates 101 and 102 are insulating substrates containing Si as a main component. Further, in the present preferred embodiment, an insulating layer 104 is formed on the surface of the silicon substrate 101. The total thickness of the silicon substrate 101, the insulating layers 103 and 104 that are laminated preferably is equal or substantially equal to the thickness of each of the detection beam 14A and the support beams 14B and 14C.

Then, the piezoresistive element 16 (p+ layer) is formed in the silicon substrate 101 at the surface side using a photolithography technique and an impurity injection technique. The injection wirings 17 (p++ layer) are formed in the silicon substrate 101 at the surface side with a predetermined pattern using the photolithography technique and the impurity injection technique.

Figure 4B:
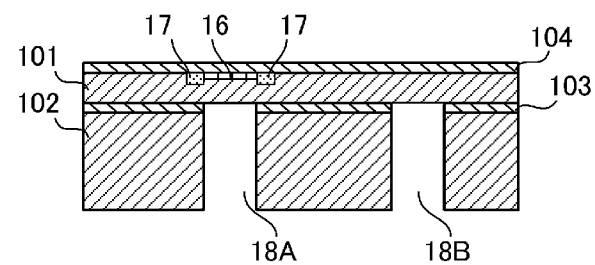

Thereafter, as illustrated in FIG. 4B, dry etching using fluorine-based gas ($CF_4$, $C_4F_8$, $SF_6$, or the like) or chlorine-based gas ($Cl_2$) is performed from the rear surface side of the SOI substrate 100 (silicon substrate 102 side) using the photolithography technique and an etching technique. With this, a space 18A which will be a space between the weight portion 13 and the fixing portion 12 later and a space 18B which will be a space enabling the weight portion 13 to be displaceable are formed.

Figure 4C:
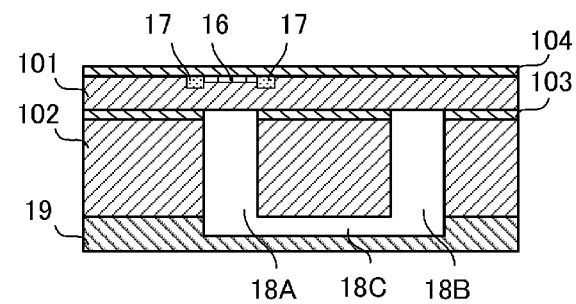

Subsequently, as illustrated in FIG. 4C, a lid member 19 is bonded to the rear surface side (silicon substrate 102 side) of the SOI substrate 100. The lid member 19 includes a space 18C formed so as to communicate with the spaces 18A and 18B. It is preferable that the lid member 19 be made of a material same as that of the silicon substrate 102.

Figure 4D:
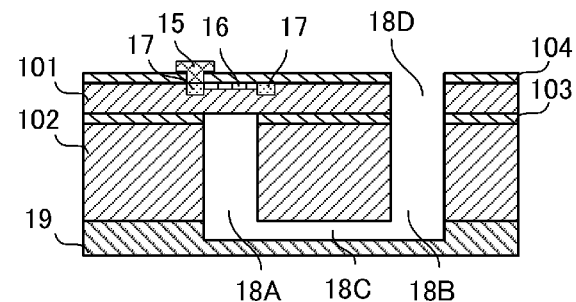

Then, as illustrated in FIG. 4D, dry etching is performed from the surface side of the SOI substrate 100 (insulating layer 104 side) using the photolithography technique and the etching technique so as to form a space 18D communicating with the space 18B. Further, the metal wiring 15 is formed on the surface of the insulating layer 104, that is, the surface of the SOI substrate 100. The metal wiring 15 is formed so as to be connected to the injection wirings 17 in the silicon substrate 101. Thereafter, a portion of each of the insulating layer 104, the silicon substrate 101, and the insulating layer 103 is removed from the surface side of the SOI substrate 100 by dry etching, and portions corresponding to the weight portion 13, the fixing portion 12, the detection beam 14A, and the support beams 14B and 14C are left. These processes are made to achieve a configuration in which the weight portion 13 is supported in a displaceable manner.

After that, the broken states of the support beams 14B and 14C are able to be grasped by detecting the wiring resistance of the metal wiring 15A as the wiring portion for the characteristic screening as described above. Vibration characteristics and the like for acceleration acting on the acceleration sensor 11 changes depending on the broken states of the support beams 14B and 14C. Therefore, whether the vibration characteristics and the like for the acceleration of the acceleration sensor 11 is preferable or not is able to be grasped based on the wiring resistance of the metal wiring 15A. Accordingly, a troublesome operation of screening the characteristics of the acceleration sensor 11 based on variation in output from the piezoresistive elements 16A to 16D is not necessary, thus enabling reliable screening of the acceleration sensor 11 with characteristic failure.

Second Preferred Embodiment

Next, a wiring structure in an acceleration sensor 21 according to a second preferred embodiment or the present invention will be described. The second preferred embodiment has the wiring structure different from that in the first preferred embodiment.

Figure 5:
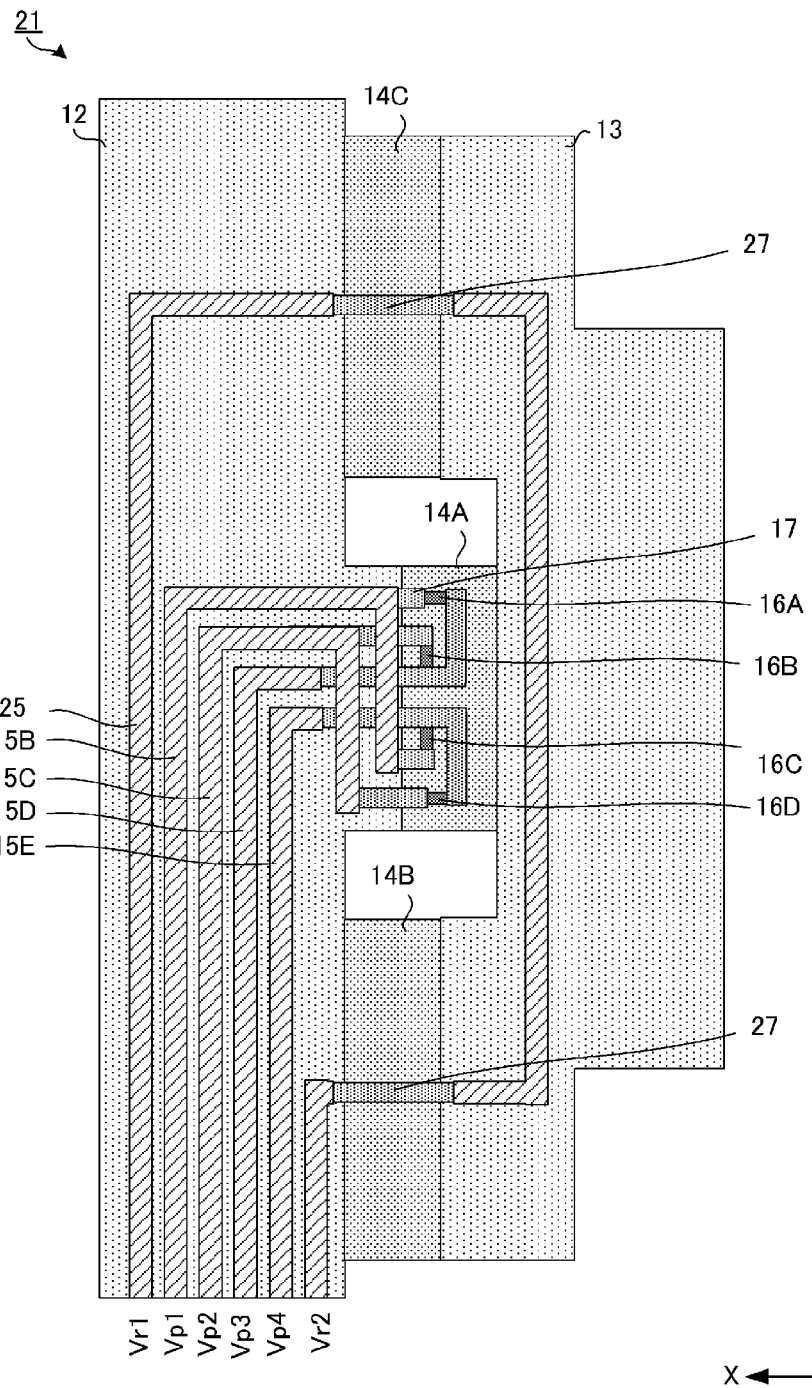
FIG. 5 is a plan view for explaining a wiring structure of an acceleration sensor according to a second preferred embodiment of the present invention.

FIG. 5 is a plan view of the acceleration sensor 21 along the X-Y plane when seen from the above.

The acceleration sensor 21 includes the fixing portion 12, the weight portion 13, the detection beam 14A, the support beams 14B and 14C, the metal wirings 15B, 15C, 15D, and 15E, the piezoresistive elements 16A, 16B, 16C, and 16D, and the injection wirings 17 as the configuration same as that in the first preferred embodiment. Further, the acceleration sensor 21 includes a metal wiring 25 and injection wirings 27 as a configuration different from that in the first preferred embodiment.

The metal wiring 25 and the injection wirings 27 are electrically connected to each other, and are wired on a path so as to start from the fixing portion 12, pass through the support beam 14C, the weight portion 13, and the support beam 14B in this order, and return to the fixing portion 12, again. The metal wiring 25 is not provided on regions overlapping the support beam 14B and the support beam 14C, and the injection wirings 27 are located on the regions overlapping the support beam 14B and the support beam 14C instead of the metal wiring 25.

Thus, the injection wirings 27 are located on the regions overlapping the support beam 14B and the support beam 14C instead of the metal wiring 25 so as to prevent the metal wiring 25 from imparting film stress onto the support beams 14B and 14C. If the film stress is imparted onto the support beams 14B and 14C from the metal wiring 25, the film stress varies depending on temperature. This leads to variation in the vibration characteristics. To avoid this situation, as in the present preferred embodiment, not the metal wiring 25 but the injection wirings 27 are provided on the regions overlapping the support beam 14B and the support beam 14C so as to prevent the variation in the vibration characteristics from occurring.

Third Preferred Embodiment

Next, a wiring structure in an acceleration sensor 31 according to a third preferred embodiment of the present invention will be described. The third preferred embodiment has the wiring structure different from that in the second preferred embodiment.

Figure 6:
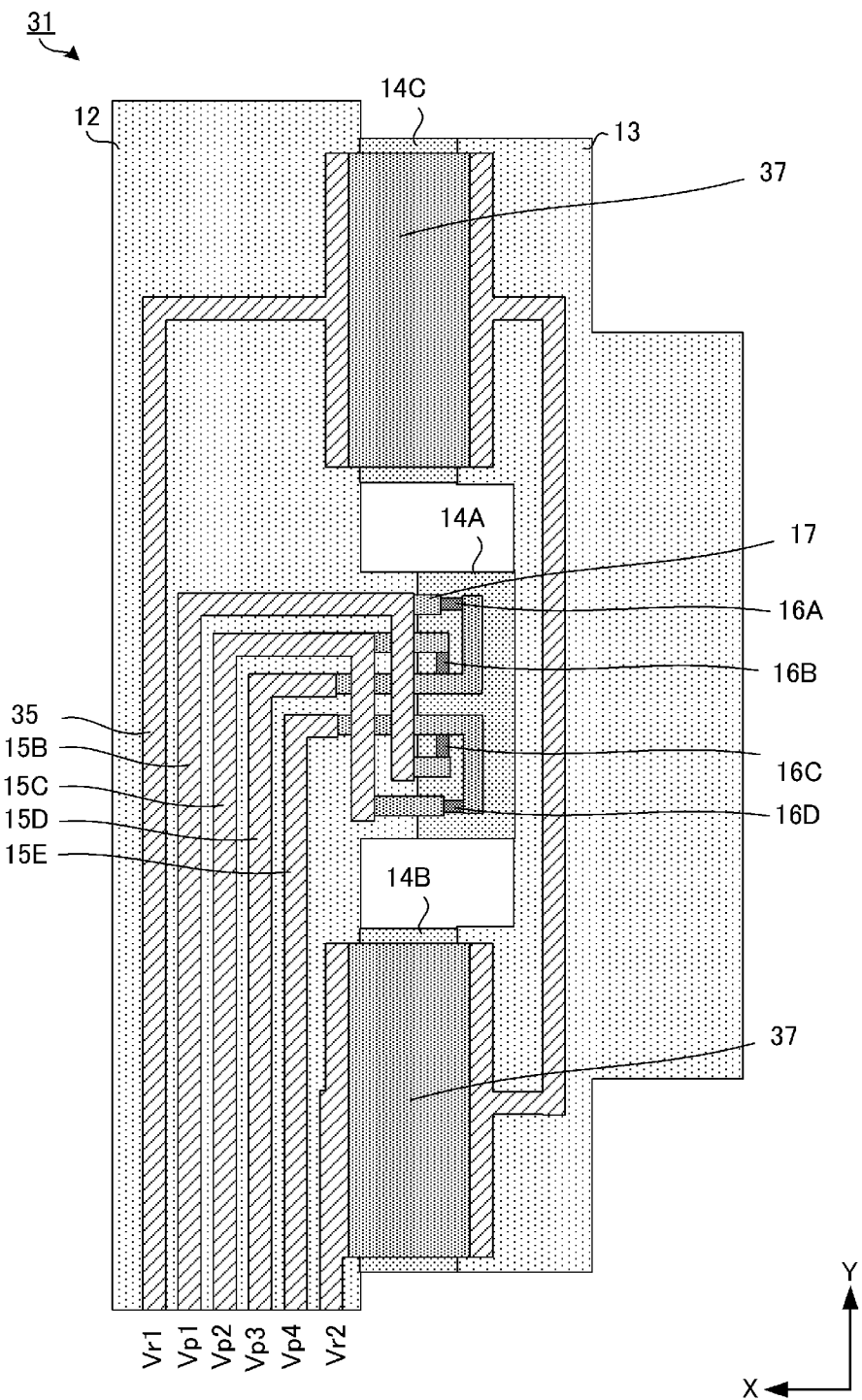
FIG. 6 is a plan view for explaining a wiring structure of an acceleration sensor according to a third preferred embodiment of the present invention.

FIG. 6 is a plan view of the acceleration sensor 31 along the X-Y plane when seen from the above.

The acceleration sensor 31 includes the fixing portion 12, the weight portion 13, the detection beam 14A, the support beams 14B and 14C, the metal wirings 15B, 15C, 15D, and 15E, the piezoresistive elements 16A, 16B, 16C, and 16D, and the injection wirings 17 as the configuration same as that in the second preferred embodiment. Further, the acceleration sensor 31 includes a metal wiring 35 and injection wirings 37 as a configuration different from that in the second preferred embodiment.

The metal wiring 35 and the injection wirings 37 are electrically connected to each other, and are wired on a path so as to start from the fixing portion 12, pass through the support beam 14C, the weight portion 13, and the support beam 14B in this order, and return to the fixing portion 12, again. The metal wiring 35 is not provided on regions overlapping the support beam 14B and the support beam 14C, and the injection wirings 37 are located on the regions overlapping the support beam 14B and the support beam 14C instead of the metal wiring 35. The injection wirings 37 have significantly larger widths in the direction orthogonal to the extending direction of the detection beam 14A and the support beams 14B and 14C, that is, in the Y-axis direction than the injection wirings 17 provided on the detection beam 14A. Further, the injection wirings 37 also have significantly larger widths in the Y-axis direction than the metal wiring 35. The metal wiring 35 has the widths in the Y-axis direction, which are equal or substantially equal to those of the injection wirings 37, only on connection ends with the injection wirings 37.

In this manner, the widths of the injection wirings 37 provided on the regions overlapping the support beam 14B and the support beam 14C are made large, thus reducing the wiring resistances of the injection wirings 37. Further, even when the support beams 14B and 14C have large widths, the injection wirings 37 are able to be overlapped substantially with the overall regions of the support beams 14B and 14C in the width direction. The breakage on the support beams 14B and 14C is able to be detected more reliably and easily.

In the present preferred embodiment, the widths of the injection wirings 37 preferably are made large. However, when the metal wiring is provided as in the first preferred embodiment, the width of the metal wiring is made large on the regions overlapping the support beams 14B and 14C preferably. Also in this case, the same effects as those in the first preferred embodiment are obtained.

Further, in the present preferred embodiment, the width of the metal wiring 35 that is connected to the injection wirings 37 is made equal or substantially equal to the widths of the injection wirings 37 only on the connection ends with the injection wirings 37 and is made smaller than the widths of the injection wirings 37 on other portions. However, the shape of the metal wiring 35 is not limited thereto. For example, the connection ends of the metal wiring 35 with the injection wirings 37 may be smaller than the widths of the injection wirings 37 or portions of the metal wiring 35 other than the connection ends with the injection wirings 37 may be made equal or substantially equal to the widths of the injection wirings 37.

Fourth Preferred Embodiment

Next, a wiring structure in an acceleration sensor 41 according to a fourth preferred embodiment of the present invention will be described. The fourth preferred embodiment has the wiring structure different from third preferred embodiment.

Figure 7:
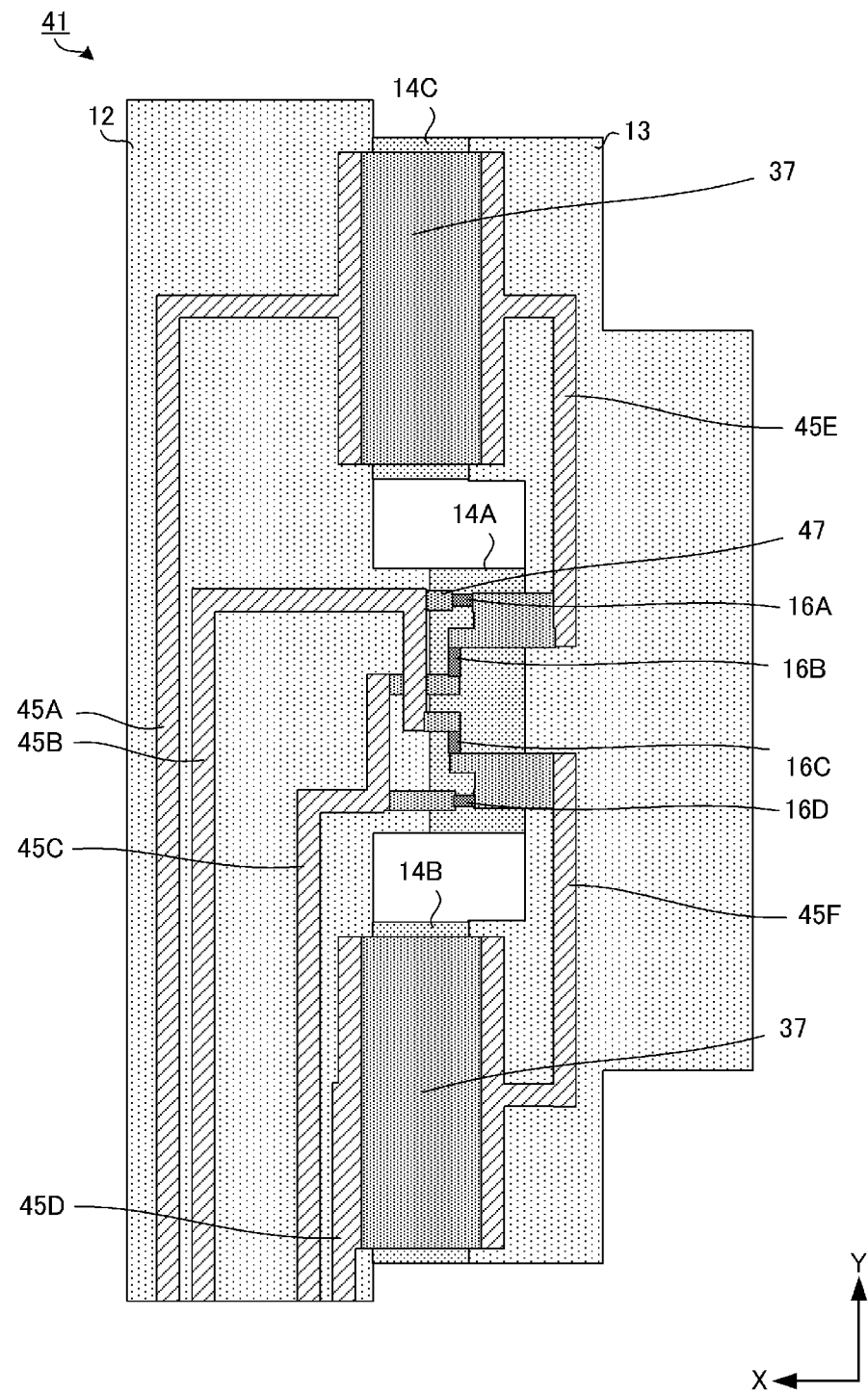
FIG. 7 is a plan view for explaining a wiring structure of an acceleration sensor according to a fourth preferred embodiment of the present invention.

FIG. 7 is a plan view of the acceleration sensor 41 along the X-Y plane when seen from the above.

The acceleration sensor 41 includes the fixing portion 12, the weight portion 13, the detection beam 14A, the support beams 14B and 14C, the piezoresistive elements 16A, 16B, 16C, and 16D, and the injection wirings 37 as the configuration same as that in the third preferred embodiment. Further, the acceleration sensor 41 includes metal wirings 45A, 45B, 45C, 45D, 45E, and 45F, and injection wirings 47 as a configuration different from that in the third preferred embodiment.

The metal wirings 45A, 45B, 45C, and 45D are provided on the fixing portion 12. One end of the metal wiring 45A is connected to the injection wiring 37 on the support beam 14C. One end of the metal wiring 45B is connected to the piezoresistive element 16A and the piezoresistive element 16C through the injection wirings 47 on the detection beam 14A. One end of the metal wiring 45C is connected to the piezoresistive element 16B and the piezoresistive element 16D through the injection wirings 47 on the detection beam 14A. One end of the metal wiring 45D is connected to the injection wiring 37 on the support beam 14B.

The metal wirings 45E and 45F are provided on the weight portion 13. One end of the metal wiring 45E is connected to the injection wiring 37 on the support beam 14C and the other end thereof is connected to the piezoresistive element 16A and the piezoresistive element 16B through the injection wiring 47 on the detection beam 14A. One end of the metal wiring 45F is connected to the injection wiring 37 on the support beam 14B and the other end thereof is connected to the piezoresistive element 16C and the piezoresistive element 16D through the injection wiring 47 on the detection beam 14A.

That is to say, in the acceleration sensor 41, a wiring portion in which the piezoresistive elements 16A to 16D, the injection wirings 37 and 47, the metal wirings 45A to 45F are connected and which detects breakage of the support beams 14B and 14C also has a function as a wiring of the Wheatstone bridge. If this wiring structure is used, when output characteristics (resistance measurement and sensitive measurement) from the piezoresistive elements 16A to 16D are measured by the Wheatstone bridge, characteristic screening for the broken states of the support beams and the vibration characteristics is able to be executed at the same time.

In the present preferred embodiment, the widths of the injection wirings 37 provided on the regions overlapping the support beam 14B and the support beam 14C are made large as in the third preferred embodiment. However, the widths of the injection wirings provided on the regions overlapping the support beam 14B and the support beam 14C may be small as in the second preferred embodiment. In addition, the metal wirings may be provided on the regions overlapping the support beam 14B and the support beam 14C as in the first preferred embodiment. Also in these cases, the same effects as those in the first preferred embodiment are obtained.

In each of the above-mentioned preferred embodiments, the configuration in which the projecting shape and the recess shape preferably are combined as the fixing portion and the weight portion, respectively, is preferably used. However, the shapes of the fixing portion and the weight portion are not limited thereto. For example, the fixing portion may have a recess shape and the weight portion may have a projecting portion so that the combination of the projecting shape and the recess shape are inverted. Further, the fixing portion and the weight portion may have other shapes such as a hexahedron shape.

Although two support beams preferably are arranged at both sides of one detection beam in each of the above-mentioned preferred embodiments, the number and arrangement of the detection beam and the support beam are not limited thereto. For example, one detection beam and one support beam may be provided or a plurality of detection beams and a plurality of support beams may be provided. Alternatively, the support beam may be arranged at the center and the detection beams may be arranged at both sides thereof.

Hereinbefore, acceleration sensors according to various preferred embodiments of the present invention has been described in detail. However, detailed configurations and the like of the acceleration sensor can be changed in design appropriately. The actions and effects as described in the above-mentioned preferred embodiments are merely listed as the most preferable actions and effects generated by the invention and the actions and the effects according to the invention are not limited to those in the above-mentioned preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An acceleration sensor comprising:
a fixing portion;
a weight portion that is supported on the fixing portion so as to be freely displaced;
a detection beam that is connected to the fixing portion and the weight portion and on which a piezoresistive element is provided;
a support beam that is provided separately from the detection beam and is connected to the fixing portion and the weight portion; and
a wiring portion, both ends of which are extended to the fixing portion, and that is wired so as to pass through the support beam; wherein
the detection beam and the support beam are located between the weight portion and the fixing portion.

2. The acceleration sensor according to claim 1, wherein among the fixing portion, the weight portion, the detection beam, and the support beam, at least the supporting beam includes a silicon substrate and the wiring portion includes an injection wiring including impurities in the silicon substrate.

3. The acceleration sensor according to claim 1, wherein the wiring portion includes an enlarged wiring width portion on the support beam.

4. The acceleration sensor according to claim 1, wherein the piezoresistive element is connected to the wiring portion.

5. The acceleration sensor according to claim 1, wherein the acceleration sensor is a micro-electro-mechanical systems piezoresistive acceleration sensor.

6. The acceleration sensor according to claim 1, wherein the piezoresistive element is included in a Wheatstone bridge.

7. The acceleration sensor according to claim 1, wherein the fixing portion includes a projecting portion that projects toward a side of the weight portion and at least two recess portions.

8. The acceleration sensor according to claim 1, wherein the weight portion includes a recess portion that is recessed toward a side opposite a side of the fixing portion and at least two projecting portions.

9. The acceleration sensor according to claim 1, wherein the support beam is a first support beam, a second support beam is provided such that the detection beam is located between the first and second support beams.

10. The acceleration sensor according to claim 1, wherein the weight portion and the fixing portion are rectangular or substantially rectangular, and the detection beam and the support beam are flat plate-shaped.

11. The acceleration sensor according to claim 1, wherein the piezoresistive element is a first piezoresistive element, and a plurality of additional piezoresistive elements are provided to define a Wheatstone bridge with the first piezoresistive element.

12. The acceleration sensor according to claim 11, further comprising a plurality of wirings connected to respective ones of the piezoeresistive elements.

13. The acceleration sensor according to claim 1, wherein a metal wiring and injection wirings are electrically connected to each other, and are wired on a path starting from the fixing portion, passing through the support beam, the weight portion, and another support beam in this order, and returning to the fixing portion again.

14. The acceleration sensor according to claim 1, wherein the metal wiring is not provided on regions overlapping the support beam and the another support beam, and the injection wirings are located on the regions overlapping the support beam and the another support beam.

15. The acceleration sensor according to claim 14, wherein the injection wirings include enlarged width portions that are larger than a width of the metal wiring, and the enlarged width portions overlap the support beam and the another support beam.

16. The acceleration sensor according to claim 15, wherein the width of the metal wiring is equal or substantially equal to the widths of the injection wirings only at connection ends where the metal wiring is connected to the injection wirings.

17. The acceleration sensor according to claim 1, wherein a plurality of metal wirings are provided on the fixing portion and a plurality of metal wirings on the weight portion.

18. An acceleration sensor comprising:
a fixing portion;
a weight portion that is supported on the fixing portion so as to be freely displaced;
a detection beam that is connected to the fixing portion and the weight portion and on which a piezoresistive element is provided;
a support beam that is provided separately from the detection beam and is connected to the fixing portion and the weight portion; and
a wiring portion, both ends of which are extended to the fixing portion, and that is wired so as to pass through the support beam and the weight portion; wherein
the detection beam and the support beam are located between the weight portion and the fixing portion.

19. An acceleration sensor comprising:
a fixing portion;
a weight portion that is supported on the fixing portion so as to be freely displaced;
a detection beam that is connected to the fixing portion and the weight portion and on which a piezoresistive element is provided;
a support beam that is provided separately from the detection beam and is connected to the fixing portion and the weight portion; and
a wiring portion, both ends of which are extended to the fixing portion, and that is wired so as to pass through the support beam and connected to circuit terminals for characteristic screening; wherein
the detection beam and the support beam are located between the weight portion and the fixing portion.

* * * * *